Dec. 10, 1935. F. R. SHANLEY 2,024,067
APPARATUS FOR TESTING SHOCK ABSORBING STRUTS FOR AIRPLANES
Filed May 3, 1933 3 Sheets-Sheet 1

Francis R. Shanley INVENTOR

Dec. 10, 1935. F. R. SHANLEY 2,024,067
APPARATUS FOR TESTING SHOCK ABSORBING STRUTS FOR AIRPLANES
Filed May 3, 1933   3 Sheets-Sheet 2

Francis R. Shanley INVENTOR

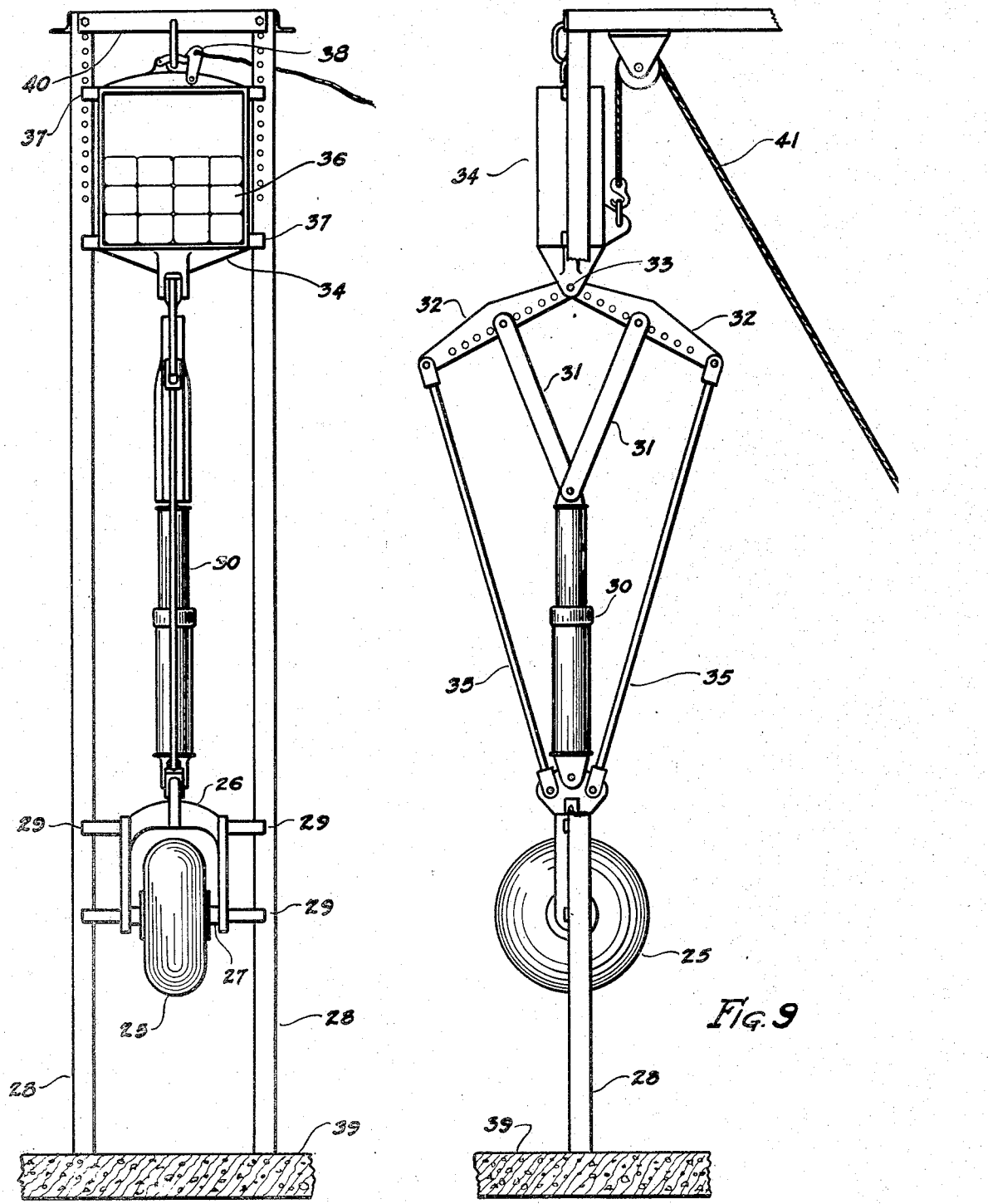

Patented Dec. 10, 1935

2,024,067

UNITED STATES PATENT OFFICE 2,024,067

APPARATUS FOR TESTING SHOCK-ABSORBING STRUTS FOR AIRPLANES

Francis R. Shanley, Washington, D. C.

Application May 3, 1933, Serial No. 669,242

11 Claims. (Cl. 265—13)

This invention relates to improvements in apparatus for testing shock-absorbing units for airplanes and provides a means whereby the conditions actually existing on the airplane can be accurately reproduced in the test.

Figures 3, 4, 5, and 6 are schematic drawings illustrating various forms of the improved apparatus.

Figure 5:
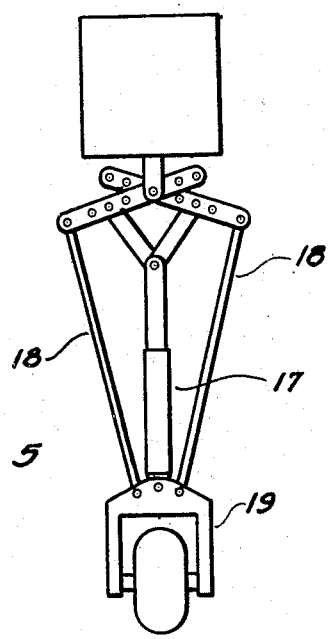
Figure 7:
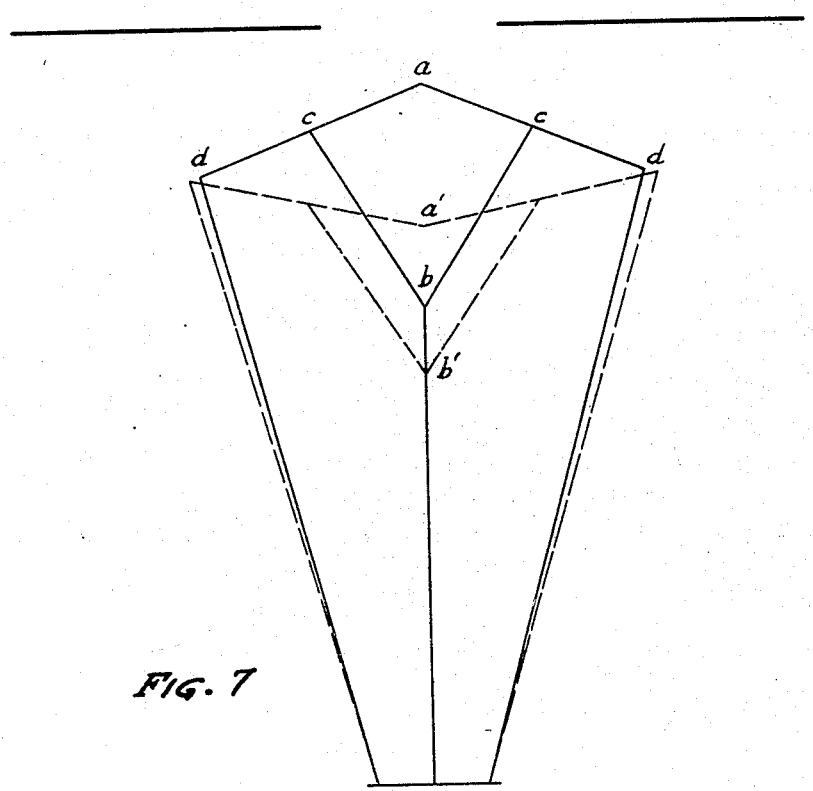

Figure 7 is a geometrical construction showing the action of the leverage system illustrated in Figure 5.

Figures 8 and 9 are, respectively, front and side elevations of a typical installation embodying this invention.

In order that an airplane structure shall not be subjected to excessive loads on landing, it is necessary to incorporate a shock-absorbing mechanism in the landing gear. It is often necessary to determine whether a certain shock-absorbing mechanism will absorb the kinetic energy of the airplane without subjecting the airplane structure to loads greater than those for which it has been designed. Although it is theoretically possible to analyze, mathematically, the operation of a typical landing gear shock-absorbing mechanism, the mathematics involved are usually very complicated and tedious. This is particularly true when a shock-absorbing strut of the "oleo" type is used in conjunction with a pneumatic tire, this combination being the most commonly used on modern airplanes. It will be appreciated that the pneumatic tire is, in itself, a shock-absorbing unit, as evidenced by the fact that on small airplanes the entire shock-absorbing capacity is often supplied by a pneumatic tire of suitable size. Although the prediction of the shock-absorption capacity and characteristics of a pneumatic tire acting alone is relatively simple, an entirely different situation exists when a pneumatic tire is used in conjunction with a shock-absorbing strut. In short, it is not possible to combine, in a simple manner, the results of separate tests of a shock-absorbing strut and a pneumatic tire. For this reason, the behavior of a certain combination of shock-absorbing units consisting of a shock-absorbing strut and a pneumatic tire can at present be determined accurately only by testing the entire combination as it is installed on the airplane. As this is often impracticable and expensive, it is common practice to test the particular combination of shock-absorbing units in a special testing machine. In certain cases this introduces appreciable errors in the results. This can readily be understood by referring to Figure 1, where each shock-absorbing strut I is so installed on the airplane that, for a given vertical load on the wheel and tire 2, a considerably greater load exists in the strut I. Likewise, for a given downward displacement of the airplane body 3 with respect to the ground, the distance through which the strut I is compressed will not be the same as the vertical movement of the axle 4 with respect to the airplane. The relative magnitude of the forces, displacements, and velocities of the axle and shock-absorbing strut can readily be determined for any airplane by ordinary geometrical methods.

Figure 2:
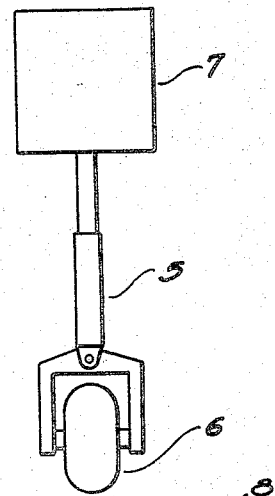
Figure 2 is a schematic drawing illustrating the principle of the dynamic testing apparatus in common use.

In the apparatus previously used for the testing of shock-absorbing struts the strut is tested in a vertical position and in line with the wheel and tire, as shown in Figure 2. In this figure the shock-absorbing strut is represented by 5, the wheel and tire by 6, and the weight box used in applying the load, by 7. The guides and other necessary features are not shown. The apparatus is used by allowing the system shown to drop freely through a given vertical distance, $h$, and obtaining, by means of suitable instruments, the data required to determine the maximum load developed in the shock-absorbing strut 5. It is obvious that the total energy to be absorbed at the instant of impact of the tire 6 with the base 8 is directly proportional to the mass of the freely-dropping apparatus and the initial height of drop.

Figure 1:
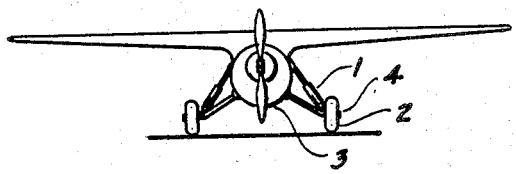
Figure 1 is a front view of an airplane showing a typical method of installing the shock-absorbing struts.

In cases where the shock-absorbing struts are installed as shown in Figure 1, it is impossible to reproduce the conditions exactly by means of the apparatus illustrated in Figure 2. The load on the tire 6 will be the same as the load on the strut 5, while the velocity of the strut piston will not be correct if the correct height of free drop is used. Various means of correcting the results have been tried, but none are completely satisfactory. The situation is most serious in the case of hydraulic shock-absorbing struts, in which the velocity of the piston has a marked effect on the shock-absorption characteristics and therefore should always be the same as it would be in the actual installation.

The object of this invention is to eliminate the difficulties enumerated above in a simple and practical manner, thus enabling the true shock-absorption characteristics to be obtained without the necessity for a dynamic test of the complete landing gear structure and without recourse to compromising adjustments of the test values obtained from a straight drop-test.

Figure 3:
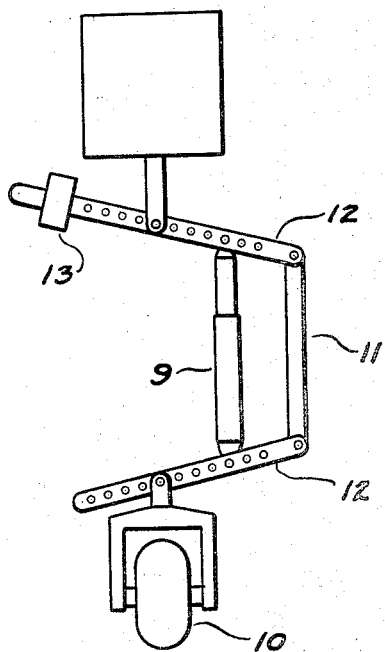

The simplest form of this invention is shown in Figure 3. By comparison of Figure 3 with Figure 2 it will be seen that the shock-absorbing strut 9 will have a load approximately twice as great as the load applied to the tire 10. The ratio of the load in the strut 9 to the load on the tire 10 can be easily increased or decreased by moving the strut 9 closer to or farther away from the member 11. Holes are provided in members 12, 12 for this purpose. If the correct load ratio is obtained by proper adjustment, it follows that the proper velocity ratio will also be obtained. The actual conditions existing on the airplane therefore can be very closely reproduced.

Figure 4:
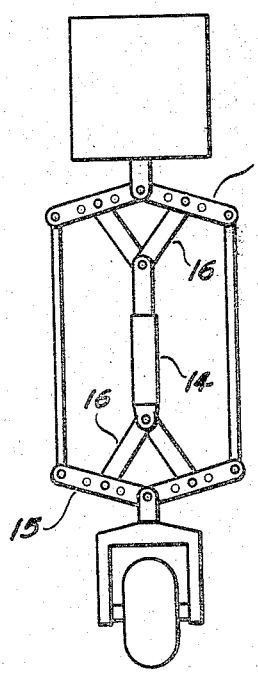

The apparatus diagrammatically illustrated in Figure 3 is not symmetrical and would require some form of counterbalancing such as indicated by the weight 13. To eliminate the necessity for counterbalancing, the systems shown in Figures 4 or 5 may be used. In Figure 4 the shock-absorbing strut 14 is symmetrically located and is connected with beams 15, 15 by the members 16, 16. This arrangement is almost equivalent to a double arrangement of the leverage system shown in Figure 3, except that the loads from the levers 15, 15 are combined into a single load at each end of the strut 14 by means of members 16, 16. All the joints shown are pin joints.

In Figure 5, the arrangement at the top of the strut 17 is identical with that of Figure 4, but the members 18, 18 are attached directly to the wheel fork 19, thereby eliminating several members.

Figure 6:
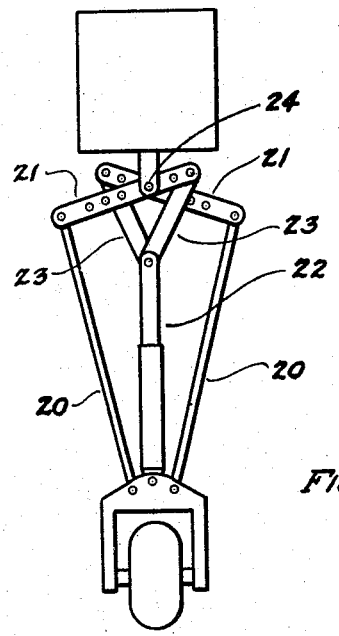

Figure 6 illustrates how this apparatus would be used for testing shock-absorbing struts in which the strut load is less than the wheel load. In this case the members 20, 20 would be in compression during the test. Members 21, 21 are independent of each other except that they are joined to the weight box by a common point, 24. It is obvious that the load in the shock-absorbing strut 22 is decreased below the wheel load when members 20, 20 are attached to members 21, 21 on opposite sides of the center pivot 24 from members 23, 23, as shown.

Figure 7 is a centerline drawing of an arrangement such as shown in Figure 5. The members b—c are shown attached to members a—d so that the load in the strut b—e will equal twice the load applied at a. The dotted lines indicate the deflected position of the system. By inspection it will be seen that the distance b—b' is very nearly one-half the distance a—a', which is the desired relationship. The slight error introduced in using the particular arrangement illustrated in Figure 5 is not serious enough to warrant using a more elaborate leverage system. It is therefore believed that the arrangements illustrated in Figures 5 and 6 will suffice for the testing of all shock-absorbing struts which are installed on the airplane in such a manner that the ratio between the load in the shock strut and the load on the wheel axle is different from unity.

Figures 8 and 9 represent views of a typical dynamic-testing apparatus in which the principles of this invention have been incorporated. Only the major parts are shown, the usual instruments for measuring load, deflection, acceleration, and so forth, having been omitted. The use of at least one of such instruments is, of course, essential to the procuring of records during a test, but since such usage is well understood by those acquainted with the art, no attempt has been made to illustrate the various instruments in the drawings.

In Figures 8 and 9 the wheel and tire 25 are attached to the fork 26 by means of the axle 27. The fork 26 is restrained to travel vertically along the upright members 28, 28 by means of the guides 29, 29. The shock-absorbing strut 30 is attached to the fork 26 at one end and to levers 31, 31 at the other end. Levers 31, 31 are attached to beams 32, 32 in such a way that their point of attachment can be changed to give the desired ratio between the load in the shock-absorbing strut 30 and the load applied at joint 33 by the weight box 34. The outer ends of members 32, 32 are connected to the fork 26 by means of members 35, 35. Weights 36 are placed in the weight box 34 to give the required total test load. Weight box 34 is provided with guides 37, 37 to restrain it to travel along the vertical members 28, 28. A quick-release mechanism 38 is used to hold the assembly at the desired height and to permit the weight box 34 to be released by the operator. The height of free drop above the base 39 can be adjusted by varying the position of cross member 40. Means for raising the assembly after dropping are indicated by the hoist cable 41.

It will be appreciated that this invention will be used largely for testing the particular combination of shock-absorbing units represented by a shock-absorbing strut and a pneumatic tire. This combination has accordingly been illustrated in the drawings. The apparatus can, of course, be used for other combinations of shock-absorbing units or for a single shock-absorbing unit. The latter case would be exemplified by a landing gear installation such as shown in Figure 1 employing a hard tire having no shock-absorbing properties.

Summarizing: the apparatus illustrated in Figures 8 and 9 is used for the dynamic-testing of shock-absorbing units in the same manner as the conventional apparatus, the essential difference being that the correct ratio between the basic load in the shock-absorbing strut and the basic load on the tire can be obtained by varying the upper point of attachment of levers 31, 31 to beams 32, 32, whereas in the conventional system such an adjustment is impossible. This improvement permits the correct height of drop, as well as the correct basic tire load, to be used in the test. The relative velocity of the moving parts of the shock-absorbing strut will also be correct. Instruments for measuring the load in the shock-absorbing strut, the velocity of the various components, and any other desirable quantities may be used in conjunction with this apparatus without changing the mode of operation and without the addition of any novel features to the invention herein described.

I claim:

1. An apparatus for dynamically testing shock-absorbing units used in airplane landing gear, by means of which the forces which would act on a shock-absorbing unit in a dynamic test of an airplane landing gear are closely reproduced, consisting of means for supplying kinetic energy through the use of a moving mass and means for causing said kinetic energy to be absorbed by the shock-absorbing unit, the second-mentioned means including a leverage system which transmits a decelerating force to said moving mass and at the same time applies to said shock-absorbing unit a force different in magnitude from said decelerating force, the ratio between said forces being determined by the arrangement of said leverage system so as to approximate closely the ratio which would exist in the actual airplane.

2. An apparatus for testing combinations of shock-absorbing units used in airplane landing gear, by means of which the forces which would act on the shock-absorbing units in a dynamic test of an airplane landing gear are closely reproduced, consisting of means for supplying kinetic energy through the use of a moving mass and means for causing said kinetic energy to be absorbed by a combination of shock-absorbing units, the second-mentioned means including a leverage system which transmits a decelerating force to said moving mass and at the same time applies forces to each of said shock-absorbing units, each of the last mentioned forces being of different magnitude and proportioned by the arrangement of said leverage system so as to approximate closely the proportion which would exist in the actual airplane.

3. An apparatus as described in claim 1, in which additional means are provided for adjusting the ratio of the decelerating force to the force on the shock-absorbing unit to any desired value.

4. An apparatus as described in claim 2, in which additional means are provided for adjusting the ratio between the forces acting on the shock-absorbing units to any desired value.

5. An apparatus as described in claim 1, in which the leverage system is substantially symmetrical with respect to the centerline of the shock-absorbing unit.

6. An apparatus as described in claim 2, in which the shock-absorbing units are in line with and the leverage system is symmetrically disposed about the centerline of travel of the mass.

7. An apparatus as described in claim 1, in which means are included for balancing the inertia forces of the apparatus about the centerline of travel of the mass.

8. In an apparatus for dynamically testing shock-absorbing units, a leverage system adapted to be symmetrically disposed about a shock-absorbing unit, the members of said leverage system being pivotally connected in such a manner that a given deflection of the leverage system in the direction of motion of said shock-absorbing unit will produce a deflection of different magnitude in the shock-absorbing unit, the ratio between said deflections being determined by the arrangement of said leverage system so as to approximate closely the ratio which would exist in the actual airplane.

9. In an apparatus for dynamically testing shock-absorbing units, a leverage system as described in claim 8, in which means are included for varying the geometrical relationship of the pivotally connected members in such a way that the ratio of the deflection of the leverage system to the deflection of the shock-absorbing unit can be adjusted to any desired value.

10. A leverage system for loading a shock-absorbing strut, comprising a member through which a force is applied to the system, two beams pivotally connected to said member, a second member attached to one end of the shock-absorbing strut, two arms pivotally attached to opposite ends of said beams and pivotally connected to said second member, two more arms pivotally attached at a common point on the other end of said shock-absorbing strut, the other ends of the last-mentioned arms being pivotally attached at points on said beams equidistant from the point of attachment of said beams to the first-mentioned member, the entire leverage system being symmetrically disposed about the centerline of said shock-absorbing unit.

11. A leverage system as described in claim 10, in which means are provided for varying the points of attachment of the last-mentioned arms to the beams.

FRANCIS R. SHANLEY.